(12) United States Patent
Zhu et al.

(10) Patent No.: US 9,148,208 B2
(45) Date of Patent: Sep. 29, 2015

(54) ANTENNA SELECTION CODEBOOK FOR FULL DIMENSIONAL MIMO SYSTEMS

(71) Applicant: Intel IP Corporation, Santa Clara, CA (US)

(72) Inventors: Yuan Zhu, Beijing (CN); Xiaogang Chen, Beijing (CN); Fangze Tu, Beijing (CN); Qinghua Li, San Ramon, CA (US); Hooman Shirani-Mehr, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/486,029

(22) Filed: Sep. 15, 2014

(65) Prior Publication Data
US 2015/0215014 A1 Jul. 30, 2015

Related U.S. Application Data

(60) Provisional application No. 61/933,837, filed on Jan. 30, 2014.

(51) Int. Cl.
| | |
|---|---|
| *H04B 7/02* | (2006.01) |
| *H04B 7/04* | (2006.01) |
| *H04L 25/02* | (2006.01) |
| *H04W 72/04* | (2009.01) |

(52) U.S. Cl.
CPC .......... *H04B 7/0456* (2013.01); *H04L 25/0248* (2013.01); *H04W 72/042* (2013.01)

(58) Field of Classification Search
CPC .... H04B 7/0456; H04B 7/0478; H04B 7/043; H04B 7/0639; H04B 7/0408; H04B 7/0617; H04B 7/0469; H04B 7/0634; H04B 7/0691; H04B 7/061; H04B 7/0413; H04B 7/0669; H04B 7/0452; H04B 7/0663; H04W 52/42; H04L 25/03343; H04L 2025/03426; H04L 1/0618; H04L 5/0023; H04L 25/0242; H04L 25/0248
USPC .......................................................... 375/267
See application file for complete search history.

(56) References Cited

U.S. PATENT DOCUMENTS

| | | | | |
|---|---|---|---|---|
| 2011/0150113 | A1* | 6/2011 | Oyman et al. ................ | 375/260 |
| 2011/0305263 | A1* | 12/2011 | Jongren et al. ................ | 375/219 |
| 2012/0314590 | A1* | 12/2012 | Choudhury et al. .......... | 370/252 |
| 2013/0308714 | A1* | 11/2013 | Xu et al. ....................... | 375/267 |
| 2014/0177745 | A1* | 6/2014 | Krishnamurthy et al. .... | 375/267 |

* cited by examiner

*Primary Examiner* — Don N Vo
(74) *Attorney, Agent, or Firm* — Schwegman Lundberg & Woessner, P.A.

(57) ABSTRACT

Embodiments of a system and method for beamforming in a Wireless Network are generally described herein. In some embodiments, an enhanced Node B (eNB) transmits to User Equipment (UE), from a plurality ($N_c$) of antenna ports of a plurality ($N_t$) of transmit antennas, a data signal where signal power is allocated in eigen beams, each of the $N_t$ transmit antennas having antenna ports that are adjustable in elevation and in azimuth. The eNB also determines and transmits to the UE a $P_c$ set of the largest principal eigen beams of the data signal and receives, as feedback from the UE, a precoding matrix that identifies the antenna port from which strongest energy in the data signal is detected at the UE. The eNB uses the precoding matrix for beamforming.

29 Claims, 2 Drawing Sheets

ANTENNA SELECTION CODEBOOK FOR FULL DIMENSIONAL MIMO SYSTEMS

PRIORITY CLAIM

This application claims priority under 35 U.S.C. 119(e) to U.S. Provisional Patent Application Ser. No. 61/933,837, filed Jan. 30, 2014 which is incorporated herein by reference in its entirety.

TECHNICAL FIELD

Embodiments pertain to wireless communications. Some embodiments relate to Multiple Input Multiple Output (MIMO) antenna arrays, including Full Dimensional MIMO (FD MIMO) antenna arrays, for LTE Advanced technology.

BACKGROUND

One issue with communicating data over a wireless network is multipath, wherein transmitted information signals bounce off objects causing them to reach the receiving antenna multiple times as diverse signals via different angles and at slightly different times. This may cause interference and delay wireless signals.

Thus there are general needs for systems and methods that reduce signaling, bandwidth and delay associated with multipath. MIMO technology takes advantage of multipath behavior by using multiple, smart transmitters and receivers with an added spatial dimension, to dramatically increase performance and range. MIMO enables antennas to combine data streams arriving from different paths and at different times to effectively increase receiver signal-capturing power by using special diversity technology. Recently, full dimensional multiple input multiple output (FD-MIMO) has been discussed in the academy and industry. Unlike conventional MIMO techniques, FD-MIMO can leverage the significantly increased freedom offered by the advanced antenna arrays with large number of antenna elements which can be adjusted individually in both elevation and azimuth. FD-MIMO offers advantages by simultaneously supporting elevation and azimuth beamforming, with a practical antenna panel form factor. The objective of MIMO beamforming is to focus beams from a number of transmitting antennas to create a maximum on one or more receiving antennas.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
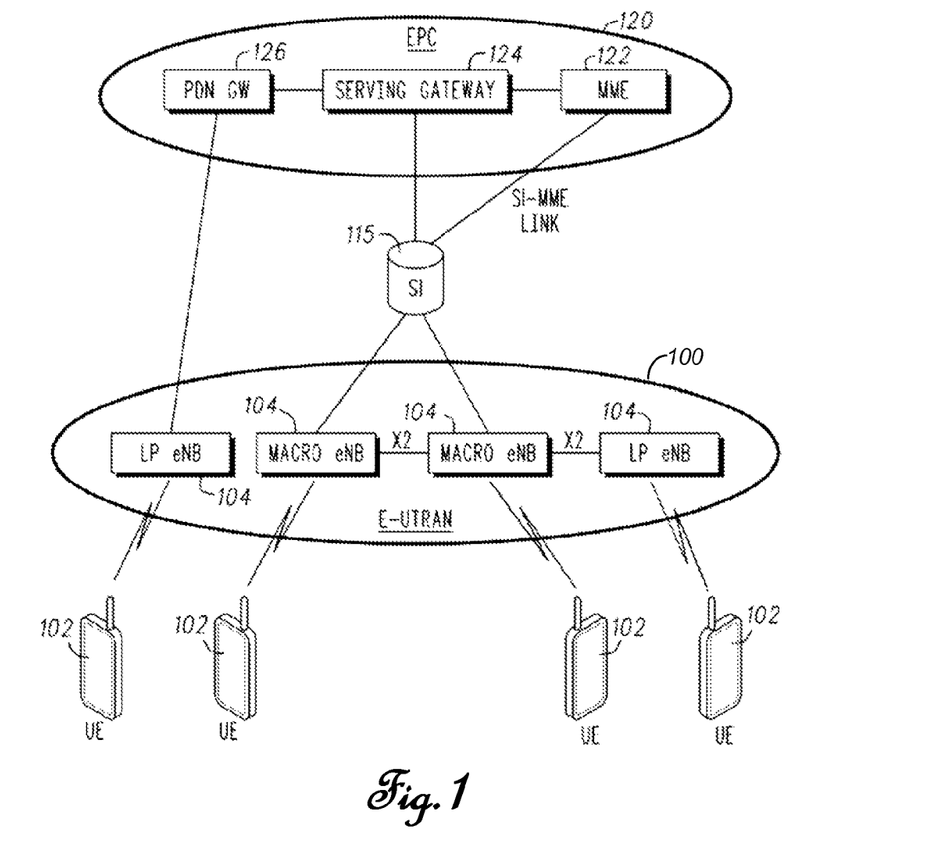
FIG. 1 is a functional diagram of a portion of an end-to-end network architecture of an LTE network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate orthogonal frequency division multiplexing (OFDM) communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and hybrid automatic repeat request (H-ARQ) information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

In some embodiments, the mobile device may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas may be effectively separated to take advantage of spatial diversity and the different channel characteristics that may result.

Although the mobile device is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 2:
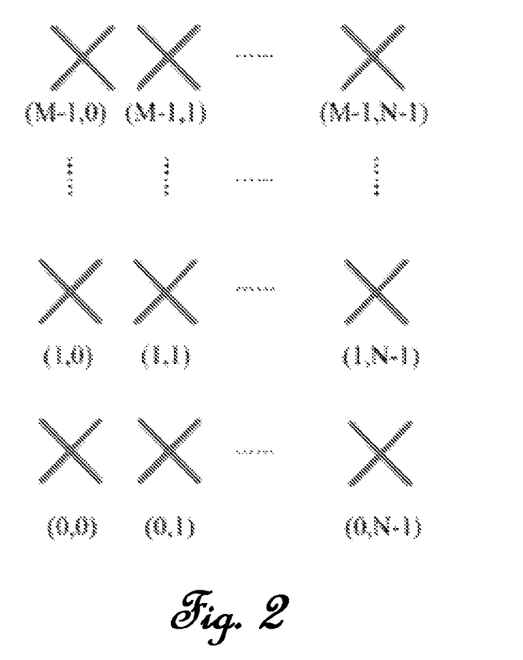
FIG. 2 is a block diagram of a two dimensional planar antenna structure where each column is a cross-polarized array in accordance with some embodiments.

FIG. 2 illustrates a block diagram of a two dimensional (2D) planar antenna structure where each column is a cross-polarized array in accordance with some embodiments. The recent advance in antenna technologies has created new possibilities to control the beam forming weight of each individual antenna element of a large antenna array, each adjustable in azimuth and elevation. One possible configuration of M and N for the array of FIG. 2 is M=10 and N=2. In this configuration the 2D planar antenna array contains 40 antenna elements. In one embodiment, half of the antenna elements may have a slant angle 45 degrees and the other half of antenna elements may have a slant angle −45 degrees.

In the LTE-Advanced (LTE-A) system up to Release 12, Common Reference Signals (CRS) and Channel State Information Reference Signal (CSI-RS) may be used to feedback channel state information in the downlink. The number of antenna ports supported in the LTE-A Release 12 specification may be {1, 2, 4} for CRS and {1, 2, 4, 8} for CSI-RS.

Since the number of ports the Release 12 specification supports may be significantly smaller than number of antenna elements one large antenna array could have, how to design closed loop MIMO CSI feedback becomes an open question.

An FD-MIMO system can be described by:

$$y = HPx + n \quad (1)$$

where y is an $N_r \times 1$ receive vector, x is an $N_p \times 1$ transmit vector, H is an $N_r \times N_t$ matrix,
P is an $N_t \times N_p$ matrix,
n is an $N_r \times 1$ noise vector,
$N_r$ is the number of receiving antennas,
$N_t$ is the number of transmitting antennas, and
$N_p$ is the number of layers of actual data.

P represents a precoding matrix and may use $N_t$ transmit antennas to transmit $N_p$ layers of data, where $N_p$ is less than or equal to the minimum of ($N_t$, $N_r$). If the antenna array is a 2D antenna array as shown in FIG. 2, $N_t$=2 NM and $N_t$ is usually much larger than the antenna ports that may be available. For example when N=2 and M=10, $N_t$=40. In this embodiment, Np may belong to the set {1, 2, 3, 4, 5, 6, 7, 8}.

Without adding a larger number of antenna ports to the existing antenna port set {1, 2, 4, 8} for CSI-RS, one way to proceed is to virtualize the total $N_t$ antenna elements into $N_c \in \{1, 2, 4, 8\}$ antenna ports by mapping $N_t$ antenna elements to $N_c$ antenna ports. In this context, antenna ports are not physical antennas. They are logical entities distinguished by their reference signal sequences. In some embodiments, multiple antenna port signals can be transmitted on a single transmit antenna such as a cell specific reference signal port and UE specific reference signal port. Mapping proceeds as in equation (2) where equation (1) may be restated as:

$$y = HP_c P_d x + n = \hat{H} P_d x + n \qquad (2)$$

where
y is an $N_r \times 1$ receive vector
x is an $N_p \times 1$ transmit vector
n is an $N_r \times 1$ noise vector
$P_c$ is an $N_t \times N_c$ matrix,
$P_d$ is an $N_c \times N_p$ matrix,
$N_c$ is the number of antenna ports, and
$\hat{H} = HP_c$ is the effective channel matrix with $N_r \times N_c$.

Then the precoding design problem for precoding matrix P may be split into designing the $P_c$ matrix and the $P_d$ matrix. If we assume the $P_c$ matrix is designed semi-statically by the eNB, the $P_d$ matrix may be designed by using a codebook to quantize the measured effective channel. And the codebook used to quantize the $P_d$ matrix may also be dependent on the design of the $P_c$ matrix by the eNB. The codebook may be known (e.g., stored) at the eNB and at the UE.

In some embodiments the eNB may design the $P_c$ matrix using subspace tracking where each antenna port virtualization vector may be calculated from uplink (UL) sounding. Assume that through UL sounding, the eNB can estimate UL channel $\widetilde{H_k}$ for each individual UE where $\widetilde{H_k}$ is the estimated UL channel matrix for user k. By single value decomposition, eNB can calculate the principal eigen beams from the average channel covariance matrix of all UEs.

$$\frac{1}{K} \sum \widetilde{H_k}^H \widetilde{H_k} = USV^H \qquad (3)$$

where
$V = [v_1 \ldots v_{N_{tx}}]$,
$v_c$ is $c^{th}$ largest principal eigen beam;
U is the left hand square matrix from the single value decomposition; and
S is a diagonal singular value matrix with only its diagonal elements being non-zero and each element is one singular value;

In this case since the covariance matrix for U is hermitian, which means the conjugate transpose of one matrix equals to itself, U=V.

eNB may then construct the matrix $P_c$ as in equation (4) from the $N_c$ largest principal eigen beams from the average channel covariance matrix where, as discussed above, $N_c$ is the number of antenna ports.

$$P_c = [v_1 \ldots v_{N_c}] \qquad (4)$$

In some embodiments the eNB may design the $P_c$ matrix using a two dimensional grid of beams: K=M/2 consecutive vertical antenna elements and 2N horizontal antenna elements may be mapped to one antenna port. Thus for each antenna port, only half of the antenna elements are used. Each column of the $P_c$ matrix calculated by the eNB is designed to realize one very narrow beam pattern. For example one column of the $P_c$ matrix can be realized by the eNB as one electrical downtilt $180\theta_l/\pi \in [0,180]$ and one horizontal beamforming weight $180\phi_l/\pi \in [0,360]$. Then for equation (4):

$$v_l = [W(\theta_l) U(\phi_l)^T]^R \qquad (5)$$

where $$W(\theta_l) = \begin{bmatrix} w_1(\theta_l) \\ \vdots \\ w_K(\theta_l) \\ 0 \\ \vdots \\ 0 \end{bmatrix} \text{ if } l \text{ is even, otherwise } W(\theta_l) = \begin{bmatrix} 0 \\ \vdots \\ 0 \\ w_1(\theta_l) \\ \vdots \\ w_K(\theta_l) \end{bmatrix},$$

$$w_m(\theta_l) = \frac{1}{\sqrt{K}} e^{-i \frac{2\pi}{\lambda} d_v (m-1) \cos(\theta_l)},$$

l is a column index of the Pc matrix,
K is the number of elements in the W vector,
$\lambda$ is the wave length,
$d_v$ is the spacing between the vertical antenna elements, $$U(\varphi_l) = \begin{bmatrix} u_1(\varphi_l) \\ \vdots \\ u_N(\varphi_l) \end{bmatrix} \text{ is the discreet Fourier transform } (DFT)$$

beamforming vector to create the horizontal beam, $$u_n(\varphi_l) = \frac{1}{\sqrt{N}} e^{-i \frac{2\pi}{\lambda} d_h (n-1) \sin(\varphi_l)},$$

N is the number of elements in the U vector,
$d_h$ is the spacing between the horizontal antenna elements,
[ ]$^R$ is columnwise operation to create a column vector by reading from one matrix column by column, and
( )$^T$ is a transpose operation.

K is included to assure that the energy of the W vector is normalized. So if one matrix is N×M, after column-wise readout, it becomes a N×M by 1 matrix. As stated above, l is a column index of the Pc matrix. Each column of Pc matrix may be a two-dimensional beam, which has two parameters $\theta_l$ and $\phi_l$. $\theta_l$ defines the electrical tilt angle (adjustable elevation) in the vertical dimension and $\phi_l$ defines the horizontal steering angle (adjustable azimuth) in the horizontal dimension. Then $N_c$ equals to total number of beams. In some embodiments the angles $\theta_l$ and $\phi_l$ may be chosen to ensure $v_l$ of equation (5) are orthogonal to each other for all ports. In other embodiments the angles $\theta_l$ and $\phi_l$ may be chosen to ensure $v_l$ of equation (5) are not fully orthogonal to each other for all ports.

In another embodiment, non-DFT and Gram-Schmidt orthogonalization may be used to design the grid of beams. In yet another embodiment mixed DFT and non-DFT beams may be used to design the grid of beams and use Gram-Schmidt orthogonalization to render all the beams and non-DFT beams orthogonal.

The $P_c$ matrix may be calculated by either of the above two methods and may be transmitted to the UE, in one embodiment within the CSI-RS signal.

eNB may use the Pc matrix that it calculates to reduce the channel dimension from Nr*Nt to Nr*Nc, in other words, eNB maps Nt transmit antennas into Nc antenna ports as discussed above. Then the effective channel matrix Nr*Nc can be measured over the CSI-RS resource with Nc ports. The UE will react as if the eNB has Nc "antennas" (i.e., virtual antennas) instead of $N_t$ antennas, which meets the above objective of not increasing the antenna port set, where $N_c$ equals the number of antenna ports in the set.

The codebook can be categorized by rank, where rank is the total number of MIMO transmit streams. For a rank one codebook of the $P_d$ matrix, the codebook can be defined as in (6), below, for $N_c=8$. For a rank one codeword, if the UE found most of the channel energy is sent from the first "antenna" out of Nc "antennas" (each now a "virtual antenna" because of mapping Nt antenna elements to Nc antenna ports described above), it will recommend codeword [1 0 0 0 0 0 0 0]$^T$. Thus, here "1" means the UE measures strong energy from the corresponding virtual antenna and recommends the eNB to send data from this virtual antenna and "0" means UE measures weak energy from this virtual antenna and recommends eNB not sending data from this antenna. Thus the codebook can be used by the precoding stage of the eNB as an antenna selection codebook since each element only contains either "0" or "1". This may be viewed as a feedback of the optimum codebook matrix by which the transmitted signal may be multiplied before transmission, and is sometimes referred to as a precoding matrix indicator (PMI) discussed below. An indication of the codebook rank may also be fed-back by way of Rank Indication (RI) also discussed below. A channel quality indication (CQI) may also be feedback from the UE to the eNB. The above analysis proceeds similarly for code words of other ranks. Consequently, for both of the above methods to design the $P_c$ matrix, the codebook to quantize the $P_d$ matrix may be said to be designed as an antenna selection codebook. In order to avoid having a coverage problem with the very narrow beams created by Pc, it is may be more feasible to start with $N_c \geq 8$, or $N_c \in \{8, 16, 32, 64\}$. The codebook may be defined similarly for other $N_c$ values.

$$\left\{ \begin{bmatrix} 1\\0\\0\\0\\0\\0\\0\\0 \end{bmatrix}, \begin{bmatrix} 0\\1\\0\\0\\0\\0\\0\\0 \end{bmatrix}, \begin{bmatrix} 0\\0\\1\\0\\0\\0\\0\\0 \end{bmatrix}, \begin{bmatrix} 0\\0\\0\\1\\0\\0\\0\\0 \end{bmatrix}, \begin{bmatrix} 0\\0\\0\\0\\1\\0\\0\\0 \end{bmatrix}, \begin{bmatrix} 0\\0\\0\\0\\0\\1\\0\\0 \end{bmatrix}, \begin{bmatrix} 0\\0\\0\\0\\0\\0\\1\\0 \end{bmatrix}, \begin{bmatrix} 0\\0\\0\\0\\0\\0\\0\\1 \end{bmatrix} \right\} \quad (6)$$

For a rank two codebook of the $P_d$ matrix, the codebook may be defined as (7), below, for $N_c=8$. Half of the code words may be from two beams which are next to each other either in the elevation or azimuth dimension. The other half of the code words may be from two beams which are far from each other either in elevation or azimuth dimension. The magnitude of "far" may be determined as the orthogonally between two beams. Orthogonality can be defined as the cross-product of two beams. For example if one beam is the first column of the $P_c$ matrix and the second beam is the second column of the $P_c$ matrix, and the cross product may be expressed by beam$^1$Hbeam$^2$. If this number is 0, two beams are fully orthogonal. There can be multiple beams orthogonal to the first beam. In this case, they are equally far from the first beam. Then, in one embodiment the first one may be selected.

$$\left\{ \begin{bmatrix} 1 & 0\\0 & 0\\0 & 0\\0 & 0\\0 & 1\\0 & 0\\0 & 0\\0 & 0 \end{bmatrix} / \sqrt{2}, \begin{bmatrix} 0 & 0\\1 & 0\\0 & 0\\0 & 0\\0 & 0\\0 & 1\\0 & 0\\0 & 0 \end{bmatrix} / \sqrt{2}, \begin{bmatrix} 0 & 0\\0 & 0\\1 & 0\\0 & 0\\0 & 0\\0 & 0\\0 & 1\\0 & 0 \end{bmatrix} / \sqrt{2}, \begin{bmatrix} 0 & 0\\0 & 0\\0 & 0\\1 & 0\\0 & 0\\0 & 0\\0 & 0\\0 & 1 \end{bmatrix} / \sqrt{2}, \right.$$

$$\left. \begin{bmatrix} 1 & 0\\0 & 1\\0 & 0\\0 & 0\\0 & 0\\0 & 0\\0 & 0\\0 & 0 \end{bmatrix} / \sqrt{2}, \begin{bmatrix} 0 & 0\\1 & 0\\0 & 1\\0 & 0\\0 & 0\\0 & 0\\0 & 0\\0 & 0 \end{bmatrix} / \sqrt{2}, \begin{bmatrix} 0 & 0\\0 & 0\\1 & 0\\0 & 1\\0 & 0\\0 & 0\\0 & 0\\0 & 0 \end{bmatrix} / \sqrt{2}, \begin{bmatrix} 0 & 0\\0 & 0\\0 & 0\\1 & 0\\0 & 1\\0 & 0\\0 & 0\\0 & 0 \end{bmatrix} / \sqrt{2} \right\} \quad (7)$$

For a rank three codebook of $P_d$, the codebook can be defined as (8), below, for $N_c=8$. Since the first layer is mapped to the first code word and the second and third layers are mapped to the second code word, the second and third layers are mapped to two consecutive beams and the first layer is mapped to a beam which is far from the second and third beam. In LTE systems, eNB can transmit either one codeword or two codewords to the UE. When the transmission rank is one, eNB may transmit one codeword. When the transmission rank is greater than one, the eNB may transmit two codewords. One codeword may be produced using an error detecting code or, if desired, an error detecting and correcting code.

In one embodiment a cyclic redundancy code (CRC) may be used. Thus the UE knows whether the decoding of one codeword is correct or not by checking the CRC. When the transmission rank is three, the first codeword is mapped to the first stream/layer, and the second codeword is mapped to the second and third stream/layer. Usually when one codeword is mapped to more than one layer/stream, it is better for the multiple layers to have similar signal-to-interference-plus-noise ratio (SINR) because one codeword only has one modulation and coding scheme (MCS) regardless of how many streams it is mapped to.

$$\left\{ \begin{bmatrix} 1 & 0 & 0 \\ 0 & 0 & 0 \\ 0 & 0 & 0 \\ 0 & 0 & 0 \\ 0 & 1 & 0 \\ 0 & 0 & 1 \\ 0 & 0 & 0 \\ 0 & 0 & 0 \end{bmatrix} / \sqrt{3}, \begin{bmatrix} 0 & 0 & 0 \\ 1 & 0 & 0 \\ 0 & 0 & 0 \\ 0 & 0 & 0 \\ 0 & 0 & 0 \\ 0 & 1 & 0 \\ 0 & 0 & 1 \\ 0 & 0 & 0 \end{bmatrix} / \sqrt{3}, \begin{bmatrix} 0 & 0 & 0 \\ 0 & 0 & 0 \\ 1 & 0 & 0 \\ 0 & 0 & 0 \\ 0 & 0 & 0 \\ 0 & 0 & 0 \\ 0 & 1 & 0 \\ 0 & 0 & 1 \end{bmatrix} / \sqrt{3}, \begin{bmatrix} 0 & 0 & 1 \\ 0 & 0 & 0 \\ 0 & 0 & 0 \\ 1 & 0 & 0 \\ 0 & 0 & 0 \\ 0 & 0 & 0 \\ 0 & 0 & 0 \\ 0 & 1 & 0 \end{bmatrix} / \sqrt{3}, \right.$$

$$\left. \begin{bmatrix} 1 & 0 & 0 \\ 0 & 0 & 0 \\ 0 & 0 & 0 \\ 0 & 1 & 0 \\ 0 & 0 & 1 \\ 0 & 0 & 0 \\ 0 & 0 & 0 \\ 0 & 0 & 0 \end{bmatrix} / \sqrt{3}, \begin{bmatrix} 0 & 0 & 0 \\ 1 & 0 & 0 \\ 0 & 0 & 0 \\ 0 & 0 & 0 \\ 0 & 1 & 0 \\ 0 & 0 & 1 \\ 0 & 0 & 0 \\ 0 & 0 & 0 \end{bmatrix} / \sqrt{3}, \begin{bmatrix} 0 & 0 & 0 \\ 0 & 0 & 0 \\ 1 & 0 & 0 \\ 0 & 0 & 0 \\ 0 & 0 & 0 \\ 0 & 1 & 0 \\ 0 & 0 & 1 \\ 0 & 0 & 0 \end{bmatrix} / \sqrt{3}, \begin{bmatrix} 0 & 0 & 0 \\ 0 & 0 & 0 \\ 0 & 0 & 0 \\ 1 & 0 & 0 \\ 0 & 0 & 0 \\ 0 & 0 & 0 \\ 0 & 1 & 0 \\ 0 & 0 & 1 \end{bmatrix} / \sqrt{3} \right\} \quad (8)$$

For a rank four codebook of $P_d$, the codebook can be defined as (9), below, for $N_c = 8$. Since the first codeword is mapped to the first and second layer and the second codeword is mapped to the third and fourth layers, the first and second layers are mapped to two consecutive beams and the third and fourth layers are mapped to two consecutive beams $$\left\{ \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} / 2, \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix} / 2, \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} / 2, \begin{bmatrix} 0 & 0 & 0 & 0 \\ 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \end{bmatrix} / 2, \right.$$

$$\left. \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \end{bmatrix} / 2, \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} / 2, \begin{bmatrix} 0 & 0 & 0 & 0 \\ 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \end{bmatrix} / 2, \begin{bmatrix} 0 & 0 & 0 & 0 \\ 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \end{bmatrix} / 2 \right\} \quad (9)$$

For a rank five/six codebook of $P_d$, the codebook can be defined as (10), (11), below, for $N_c = 8$. Since the closed loop MIMO performance gain over open loop MIMO reduces with rank increases, the codebook size can also be reduced compared with the rank four codebook.

$$\left\{ \begin{bmatrix} 1&0&0&0&0\\0&1&0&0&0\\0&0&1&0&0\\0&0&0&1&0\\0&0&0&0&1\\0&0&0&0&0\\0&0&0&0&0\\0&0&0&0&0 \end{bmatrix} \Big/\sqrt{5},\begin{bmatrix} 0&0&0&0&0\\1&0&0&0&0\\0&1&0&0&0\\0&0&1&0&0\\0&0&0&1&0\\0&0&0&0&1\\0&0&0&0&0\\0&0&0&0&0 \end{bmatrix} \Big/\sqrt{5}, \right.$$
$$\left. \begin{bmatrix} 0&0&0&0&0\\0&0&0&0&0\\1&0&0&0&0\\0&1&0&0&0\\0&0&1&0&0\\0&0&0&1&0\\0&0&0&0&1\\0&0&0&0&0 \end{bmatrix} \Big/\sqrt{5},\begin{bmatrix} 0&0&0&0&0\\0&0&0&0&0\\0&0&0&0&0\\1&0&0&0&0\\0&1&0&0&0\\0&0&1&0&0\\0&0&0&1&0\\0&0&0&0&1 \end{bmatrix} \Big/\sqrt{5} \right\} \quad (10)$$

$$\left\{ \begin{bmatrix} 1&0&0&0&0&0\\0&1&0&0&0&0\\0&0&1&0&0&0\\0&0&0&1&0&0\\0&0&0&0&1&0\\0&0&0&0&0&1\\0&0&0&0&0&0\\0&0&0&0&0&0 \end{bmatrix} \Big/\sqrt{6},\begin{bmatrix} 0&0&0&0&0&0\\1&0&0&0&0&0\\0&1&0&0&0&0\\0&0&1&0&0&0\\0&0&0&1&0&0\\0&0&0&0&1&0\\0&0&0&0&0&1\\0&0&0&0&0&0 \end{bmatrix} \Big/\sqrt{6}, \right.$$
$$\left. \begin{bmatrix} 0&0&0&0&0&0\\0&0&0&0&0&0\\1&0&0&0&0&0\\0&1&0&0&0&0\\0&0&1&0&0&0\\0&0&0&1&0&0\\0&0&0&0&1&0\\0&0&0&0&0&1 \end{bmatrix} \Big/\sqrt{6},\begin{bmatrix} 1&0&0&0&0&0\\0&1&0&0&0&0\\0&0&1&0&0&0\\0&0&0&0&0&0\\0&0&0&1&0&0\\0&0&0&0&1&0\\0&0&0&0&0&1\\0&0&0&0&0&0 \end{bmatrix} \Big/\sqrt{6} \right\} \quad (11)$$

For a rank seven codebook of $P_d$, the codebook can be defined as (12), below, for $N_c=8$. The codebook size can be further reduced.

$$\left\{ \begin{bmatrix} 1&0&0&0&0&0&0\\0&1&0&0&0&0&0\\0&0&1&0&0&0&0\\0&0&0&1&0&0&0\\0&0&0&0&1&0&0\\0&0&0&0&0&1&0\\0&0&0&0&0&0&1\\0&0&0&0&0&0&0 \end{bmatrix} \Big/\sqrt{7},\begin{bmatrix} 0&0&0&0&0&0&0\\1&0&0&0&0&0&0\\0&1&0&0&0&0&0\\0&0&1&0&0&0&0\\0&0&0&1&0&0&0\\0&0&0&0&1&0&0\\0&0&0&0&0&1&0\\0&0&0&0&0&0&1 \end{bmatrix} \Big/\sqrt{7} \right\} \quad (12)$$

For a rank eight codebook of $P_d$, the codebook can be defined as (13), below, for $N_c=8$. The codebook is reduced to having only one identity matrix.

$$\left\{ \begin{bmatrix} 1&0&0&0&0&0&0&0\\0&1&0&0&0&0&0&0\\0&0&1&0&0&0&0&0\\0&0&0&1&0&0&0&0\\0&0&0&0&1&0&0&0\\0&0&0&0&0&1&0&0\\0&0&0&0&0&0&1&0\\0&0&0&0&0&0&0&1 \end{bmatrix} \Big/ 2\sqrt{2} \right\} \quad (13)$$

Figure 3:
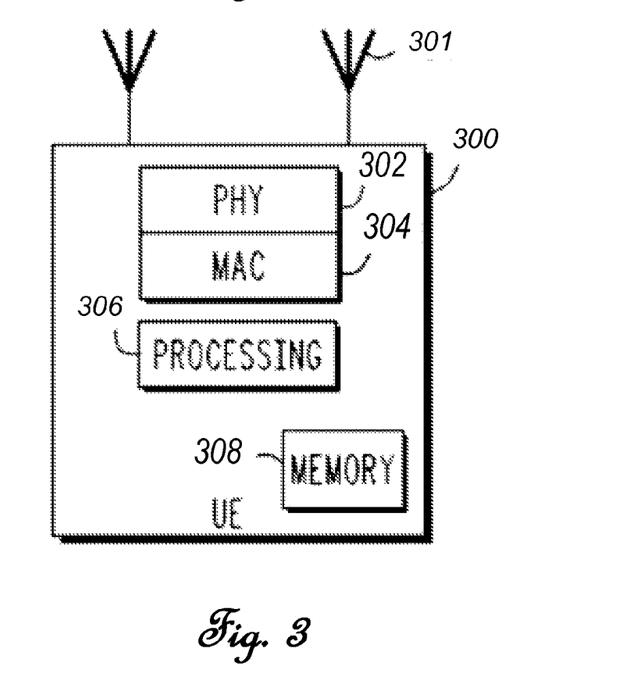
FIG. 3 illustrates a functional block diagram of user equipment (UE) in accordance with some embodiments.

FIG. 3 illustrates a functional block diagram of user equipment (UE) in accordance with some embodiments. In accordance with some embodiments, the MAC circuitry 304 may be arranged to contend for a wireless medium configure frames or packets for communicating over the wireless medium and the PHY circuitry 302 may be arranged to transmit and receive signals. The PHY 302 may include circuitry for modulation/demodulation, upconversion/downconversion, filtering, amplification, etc. In some embodiments, the processing circuitry 306 of the HEW device 300 may include one or more processors. In some embodiments, two or more antennas may be coupled to the physical layer circuitry arranged for sending and receiving signals. The memory 308 may be store information for configuring the processing circuitry 306 to perform operations for configuring and transmitting HEW frames and performing the various operations described herein.

In some embodiments, the UE 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 300 may include one or more of a keyboard, a display, a non-volatile memory port, multiple antennas, a graphics processor, an application processor, speakers, and other mobile device elements. The display may be an LCD screen including a touch screen.

The one or more antennas 301 utilized by the UE 300 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 300 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 400 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain x 0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRB s.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 400 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CHI. The PMI may be a vector that is calculated by the UE and reported to the eNB. In some embodiments, the UE may transmit a physical uplink control channel (PUNCH) of format 2, 2a or 2b containing the CHI/PMI or RI.

In these embodiments, the CHI may be an indication of the downlink mobile radio channel quality as experienced by the UE 400. The CHI allows the UE 400 to propose to an eNB an optimum modulation scheme and coding rate to use for a given radio link quality so that the resulting transport block error rate would not exceed a certain value, such as 10%. In some embodiments, the UE may report a wideband CHI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

LTE Channel Estimation

To facilitate the estimation of the channel characteristics LTE uses cell specific reference signals (i.e., pilot symbols) inserted in both time and frequency. These pilot symbols provide an estimate of the channel at given locations within a subframe. Through interpolation it is possible to estimate the channel across an arbitrary number of subframes. The pilot symbols in LTE are assigned positions within a subframe depending on the eNodeB cell identification number and which transmit antenna is being used. The unique positioning of the pilots ensures that they do not interfere with one another and can be used to provide a reliable estimate of the complex gains imparted onto each resource element within the transmitted grid by the propagation channel.

To minimize the effects of noise on the pilot estimates, the least square estimates are averaged using an averaging window. This simple method produces a substantial reduction in the level of noise found on the pilots. There are two pilot symbol averaging methods available.

Time averaging is performed across each pilot symbol carrying subcarrier, resulting in a column vector containing an average amplitude and phase for each reference signal carrying subcarrier.

All the pilot symbols found in a subcarrier are time averaged across all OFDM symbols, resulting in a column vector containing the average for each reference signal subcarrier, The averages of the pilot symbol subcarriers are then frequency averaged using a moving window of maximum size.

In some embodiments, the Primary Synchronizing Stream (PSS) and Secondary Synchronizing Signal (SSS) provide the UE with its physical layer identity within the cell. The signals may also provide frequency and time synchronization within the cell. The PSS may be constructed from Zadoff-Chu (ZC) sequences and the length of the sequence may be predetermined (e.g., 62) in the frequency domain. The SSS uses two interleaved sequences (i.e., maximum length sequences (MLS), SRG sequences or m-sequences) which are of a predetermined length (e.g., 31). The SSS may be scrambled with the PSS sequences that determine physical layer ID. One purpose of the SSS is to provide the UE with information about the cell ID, frame timing properties and the cyclic prefix (CP) length. The UE may also be informed whether to use TDD or FD. In FDD, the PSS may be located in the last OFDM symbol in first and eleventh slot of the frame, followed by the SSS in the next symbol. In TDD, the PSS may be sent in the third symbol of the 3rd and 13th slots while SSS may be transmitted three symbols earlier. The PSS provided the UE with information about to which of the three groups of physical layers the cell belongs to (3 groups of 168 physical layers). One of 168 SSS sequences may be decoded right after PSS and defines the cell group identity directly.

In some embodiments, the UE is each UE is configured in one of 8 "transmission modes" for PDSCH reception; Mode 1: Single antenna port, port 0; Mode 2: Transmit diversity; Mode 3: Large-delay CDD; Mode 4: Closed-loop spatial multiplexing; Mode 5: MU-MIMO; Mode 6: Closed-loop spatial multiplexing, single layer; Mode 7: Single antenna port, UE-specific RS (port 5); Mode 8 (new in Rel-9): Single or dual-layer transmission with UE-specific RS (ports 7 and/or 8). The CSI-RS are used by the UE for channel estimates (i.e., CQI measurements). In some embodiments, the CSI-RS are transmitted periodically in particular antenna ports (up to eight transmit antenna ports) at different subcarrier frequencies (assigned to the UE) for use in estimating a MIMO channel. In some embodiments, a UE-specific demodulation reference signal (e.g., a DM-RS) may be precoded in the same way as the data when non-codebook-based precoding is applied.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A method for antenna selection performed by User Equipment (UE), the method comprising:
   receiving, from a plurality ($N_c$) of antenna ports of a plurality ($N_t$) of transmit antennas of an enhanced Node B (eNB), a data signal where signal power is allocated in eigen beams, each of the $N_t$ transmit antennas having antenna ports that are adjustable in elevation and in azimuth;
   receiving from the eNB a $P_c$ set of signals representing the largest principal eigen beams of the data signal;
   identifying from the $P_c$ set the antenna port from which the strongest channel energy is detected at the UE, for use in constructing a precoding matrix P; and
   transmitting the precoding matrix P to the eNB, the precoding matrix indicating that data should be sent by the eNB from the identified antenna port, the precoding matrix P used by the eNB for beamforming.

2. The method of claim 1 wherein the $P_c$ set of signals representing the largest principal eigen beams is a $P_c$ matrix that includes as elements the number of transmit antennas and the number of antenna ports.

3. The method of claim 2 wherein the $P_c$ matrix is determined at the eNB by one of using subspace tracking comprising uplink sounding or using a two dimensional grid of beams wherein for each antenna port only half of the antenna elements of the transmit antenna are used.

4. The method of claim 3 wherein determining the $P_c$ matrix by using subspace tracking comprises calculating the principal eigen beams from the average channel covariance matrix of a plurality of UEs that receive the data signal from the plurality ($N_c$) of antenna ports by using $$\frac{1}{K}\Sigma \bar{H}_k^H \bar{H}_k = USV^H.$$

5. The method of claim 3 wherein the $P_c$ matrix that is determined at the eNB by using a two dimensional grid of beams is realized as one electrical downtilt $180\theta\_1/\pi \in [0, 180]$ and one horizontal beamforming weight $180\phi\_1/\pi \in [0, 360]$.

6. The method of claim 5 wherein each column of the $P_c$ matrix is a two-dimensional beam with angle parameters that identify the adjustable elevation and the adjustable azimuth of the beam.

7. The method of claim 6 wherein the angle parameters are chosen so that the largest principal eigen beams are orthogonal to each other for all antenna ports.

8. The method of claim 6 wherein the angle parameters are chosen so that the largest principal eigen beams are not fully orthogonal to each other for all antenna ports.

9. The method of claim 6 wherein the adjustable elevation angle is computed using one of $$W(\theta_l) = \begin{bmatrix} w_1(\theta_l) \\ \vdots \\ w_K(\theta_l) \\ 0 \\ \vdots \\ 0 \end{bmatrix} \text{ or } W(\theta_l) = \begin{bmatrix} 0 \\ \vdots \\ 0 \\ w_1(\theta_l) \\ \vdots \\ w_K(\theta_l) \end{bmatrix}.$$

10. The method of claim 6 wherein the adjustable azimuth angle is computed using $$U(\varphi_l) = \begin{bmatrix} u_1(\varphi_l) \\ \vdots \\ u_N(\varphi_l) \end{bmatrix}.$$

11. The method of claim 1 wherein the $P_c$ matrix maps $N_t$ transmit antennas into $N_c$ antenna ports.

12. The method of claim 1 wherein the precoding matrix P is determined at the UE by using the $P_c$ matrix and a $P_d$ matrix that comprises the number of antenna ports and the number of layers of data that are transmitted in the data signal.

13. The method of claim 12 wherein the $P_d$ matrix is determined using a codebook to quantize the measured effective channel of the data signal.

14. The method of claim 13 wherein the effective channel is measured over a CSI-RS resource with $N_c$ ports.

15. User Equipment (UE) including processing circuitry for transmitting a precoding matrix to an enhanced Node B (eNB) the processing circuitry arranged to:
   receive, from a plurality (Nc) of antenna ports of a plurality (Nt) of transmit antennas at an enhanced node B (eNB), a data signal where signal power is allocated in eigen beams, each of the Nt transmit antennas having antenna ports that are adjustable in elevation and in azimuth;
   receive from the eNB a Pc set of signals representing the largest principal eigen beams of the data signal;
   identify from the Pc set the antenna port from which the strongest channel energy is detected at the UE for use in constructing a precoding matrix P; and
   transmit a precoding matrix (P) to the eNB, the precoding matrix indicating that data should be sent by the eNB from the identified antenna port.

16. The UE of claim 15 wherein the $P_c$ set of signals representing the largest principal eigen beams is a $P_c$ matrix that includes as elements the number of transmit antennas and the number of antenna ports.

17. The UE of claim 16 wherein the Pc matrix is determined at the eNB by one of using subspace tracking comprising uplink sounding or using a two dimensional grid of beams wherein for each antenna port only half of the antenna elements of the transmit antenna are used.

18. The UE of claim 17 wherein determining the Pc matrix by using subspace tracking comprises calculating the principal eigen beams from the average channel covariance matrix of a plurality of UEs that receive the data signal from the plurality (Nc) of antenna ports by using $$\frac{1}{K}\Sigma \bar{H_k}^H \bar{H_k} = USV^H.$$

19. The UE of claim 18 wherein the Pc matrix that is determined at the eNB by using a two dimensional grid of beams is realized as one electrical downtilt $180\theta\_1/\pi\epsilon[0,180]$ and one horizontal beamforming weight $180\phi\_1/\pi\epsilon[0,360]$.

20. The UE of claim 15 wherein the $P_c$ matrix maps $N_t$ transmit antennas into $N_c$ antenna ports.

21. A method for antenna selection performed by an enhanced Node B (eNB), the method comprising:
   transmitting to User Equipment (UE), from a plurality ($N_c$) of antenna ports of a plurality ($N_t$) of transmit antennas, a data signal where signal power is allocated in eigen beams, each of the $N_t$ transmit antennas having antenna ports that are adjustable in elevation and in azimuth;
   transmitting a $P_c$ set of signals representing the largest principal eigen beams of the data signal;
   receiving from the UE, a precoding matrix constructed using the $P_c$ set, the precoding matrix identifying the antenna port from which strongest energy in the data signal is detected at the UE; and
   using the precoding matrix for performing beamforming to send data from the identified antenna port.

22. The method of claim 21 wherein the $P_c$ set of largest principal eigen beams is a $P_c$ matrix that includes as elements the number of transmit antennas and the number of antenna ports.

23. The method of claim 22 wherein the $P_c$ matrix is determined at the eNB by one of using subspace tracking comprising uplink sounding or using a two dimensional grid of beams wherein for each antenna port only half of the antenna elements of the transmit antenna are used.

24. The method of claim 23 wherein determining the $P_c$ matrix by using subspace tracking comprises calculating the principal eigen beams from the average channel covariance matrix of a plurality of UEs that receive the data signal from the plurality ($N_c$) of antenna ports by using $$\frac{1}{K}\Sigma \bar{H_k}^H \bar{H_k} = USV^H.$$

25. The method of claim 23 wherein the $P_c$ matrix determined at the eNB by using a two dimensional grid of beams is realized as one electrical downtilt $180\theta\_1/\pi\epsilon[0,180]$ and one horizontal beamforming weight $180\phi\_1/\pi\epsilon[0,360]$.

26. The method of claim 21 wherein the precoding matrix P is determined at the UE by using the $P_c$ matrix and a $P_d$ matrix that comprises the number of antenna ports and the number of layers of data that are transmitted in the data signal.

27. The method of claim 26 wherein the $P_d$ matrix is determined using a codebook to quantize the measured effective channel of the data signal.

28. A non-transitory computer-readable storage medium that stores instructions for execution by one or more processors to perform operations for transmitting a precoding matrix to an enhanced Node B (eNB), the operations comprising:
   receiving, from a plurality ($N_c$) of antenna ports of a plurality ($N_t$) of transmit antennas at an enhanced Node B (eNB), a data signal where signal power is allocated in eigen beams, each of the $N_t$ transmit antennas having antenna ports that are adjustable in elevation and in azimuth;
   receiving from the eNB a $P_c$ set of signals representing the largest principal eigen beams of the data signal;
   identifying from the $P_c$ set the antenna port from which the strongest channel energy is detected at the UE, for use in constructing a precoding matrix P; and
   transmitting the precoding matrix P to the eNB, the precoding matrix indicating that data should be sent by the eNB from the identified antenna port, the precoding matrix P used by the eNB for beamforming.

29. A method of beamforming performed by an enhanced Node B (eNB) comprising: transmitting to User Equipment (UE), from a plurality ($N_c$) of antenna ports of a plurality ($N_t$) of transmit antennas, a data signal where signal power is allocated in eigen beams, each of the $N_t$ transmit antennas having antenna ports that are adjustable in elevation and in azimuth;
   transmitting to the UE a $P_c$ set of signals representing the largest principal eigen beams of the data signal;
   receiving from the UE, a precoding matrix constructed using the $P_c$ set, the precoding matrix identifying recommended weights for the data signal at the antenna ports, the weights derived from the energy in the data signal that is detected at the UE; and
   using the precoding matrix weights for beamforming by adjusting the data signal to allocate signal power to the antenna ports in accordance with the precoding matrix weights.

* * * * *